US008296436B2

(12) United States Patent
Curcio et al.

(10) Patent No.: US 8,296,436 B2
(45) Date of Patent: Oct. 23, 2012

(54) CONVEYING PARAMETERS FOR BROADCAST/MULTICAST SESSIONS VIA A COMMUNICATION PROTOCOL (75) Inventors: Igor D. D. Curcio, Tampere (FI); Emre Aksu, Tampere (FI); Rod Walsh, Tampere (FI); Harsh Mehta, Tampere (FI); David Leon, Irving, TX (US)

(73) Assignee: Nokia Corporation, Espoo (FI)

( * ) Notice: Subject to any disclaimer, the term of this patent is extended or adjusted under 35 U.S.C. 154(b) by 893 days.

(21) Appl. No.: 10/806,023

(22) Filed: Mar. 22, 2004

(65) Prior Publication Data

US 2005/0207415 A1 Sep. 22, 2005

(51) Int. Cl.
G06F 15/16 (2006.01)

(52) U.S. Cl. ...................................... 709/227
(58) Field of Classification Search .............. 709/233, 709/205, 227; 714/4; 370/473
See application file for complete search history.

(56) References Cited

U.S. PATENT DOCUMENTS

| 6,501,763 | B1 * | 12/2002 | Bhagavath et al. | 370/432 |
| 6,567,929 | B1 * | 5/2003 | Bhagavath et al. | 714/18 |
| 6,693,907 | B1 * | 2/2004 | Wesley et al. | 370/390 |
| 6,745,364 | B2 * | 6/2004 | Bhatt et al. | 714/774 |
| 7,043,196 | B1 * | 5/2006 | Kawai et al. | 455/12.1 |
| 7,224,702 | B2 * | 5/2007 | Lee | 370/473 |
| 7,296,205 | B2 * | 11/2007 | Curcio et al. | 714/748 |
| 2002/0116471 | A1 | 8/2002 | Shteyn | |
| 2003/0120802 | A1 * | 6/2003 | Kohno | 709/237 |
| 2003/0200499 | A1 * | 10/2003 | Khayrallah | 714/776 |
| 2004/0078624 | A1 * | 4/2004 | Maxemchuk et al. | 714/4 |

FOREIGN PATENT DOCUMENTS

| CN | 1461562 A | 12/2003 |
| WO | WO 00/33534 | 6/2000 |
| WO | WO 00/36804 | 6/2000 |
| WO | 02/067473 | 8/2002 |
| WO | 2004008673 A2 | 1/2004 |
| WO | WO 2004049671 A1 * | 6/2004 |

OTHER PUBLICATIONS

RFC 2327—SDP: Session Description Protocol, Network Working Group, M. Handley, V. Jacobsen, Apr. 1998. Retrieved from <http://faqs.org/rfcs/rfc2327.html> Jan. 9, 2008.*
"Reliable Multicast Transport Building Block: Forward Error Correction Codes", Internet Engineering Task Force, Jul. 13, 2000. Retrieved from <http://www3.tools.ietf.org/html/draft-ietf-rmt-bb-fec-01> on Jan. 9, 2008.*
RFC 2327, SDP: Session Description Protocol. M. Handley, V. Jacobson, Apr. 1998. Retrieved from <http://www.ietf.org/rfc/rfc2327.txt>.*

(Continued)

Primary Examiner — Ryan Jakovac
(74) Attorney, Agent, or Firm — Alston & Bird LLP (57) ABSTRACT This invention relates to a method, a computer program, a computer program product, a system, a sender, a receiver and a session description protocol for transmitting common data from one sender (902) to a plurality of receivers (901) within a transmission session, comprising communicating (802) at least one session parameter, which is related to said transmission of said common data within said transmission session, to said plurality of receivers (901) via a communication protocol; and transmitting said common data from said sender (902) to said plurality of receivers (901) within said transmission session. The invention particularly relates to broadcast/multicast transmission of common data in a wire-bound and/or wireless network, wherein a File Delivery over Unidirectional Transport FLUTE protocol is used.

47 Claims, 2 Drawing Sheets

OTHER PUBLICATIONS

Peter B. Danzig, "Optimally Selecting the Parameters of Adaptive Backoff Algorithms for Computer Networks and Multiprocessors", Dec. 1, 1989, pp. 14, 37-39.*

"Multicast Announce and Control Protocol (MACP)", Helal et al., IETF Standard-Work-Draft, Internet Engineering Task Force, Aug. 2002.

"Multicast Communication: Protocols and Applications", Wittmann et al., Morgan Kaufmann Publishers, May 12, 2000.

"Versatile File Delivery Protocol, a Nack-based reliable multicast file transfer Protocol Instantiation", Richon et al., IETF Standard-Working-Draft, Internet Engineering Task Force, Dec. 6, 2001.

"3GPP TR 23.846, v. 6.1.0: Multimedia Broadcast/Multicast Service (MBKMS); Architecture and Funcational Description (Release 6)", Dec. 1, 2002.

Chinese Office Action for corresponding application No. 200580009100.X dated Oct. 9, 2009, 2 pages filled in Office Action form in English, 6 pages English translation of Text of Office Action and 8 pages Chinese originals of both the form and the Text of the Office Action, 16 pages total.

English translation of Chinese Office Action dated Aug. 3, 2010 in corresponding Chinese Patent Application No. 200580009100.X (11 pages).

English abstract obtained from espacenet for Publication No. CN1461562, Publication Date Dec. 10, 2003, 1 page.

IETF, Internet Draft, draft-ietf-mmusic-img-framework-03.txt, Nomura et al., "A Framework for the Usage of Internet Media Guides", 24 pages, Feb. 16, 2003.

IETF, Internet Draft, draft-ietf-mmusic-sdp-new-15.txt, Handley et al., "SDP: Session Description Protocol", 45 pages, Oct. 27, 2003.

IETF, Internet Draft, draft-ietf-rmt-flute-07.txt, Paila et al., "FLUTE—File Delivery over Unidirectional Transport", 32 pages, Dec. 11, 2003.

Network Working Group, The Internet Society, 2002, Luby et al., "Asynchronous Layered Coding (ALC) Protocol Instantiation", 34 pages.

Network Working Group, The Internet Society, 2002, Luby et al., "Layered Coding Transport (LCT) Building Block", 29 pages.

ETSI TS 122 146 V5.2.0 (Mar. 2002), Technical Specification, Universal-Mobile Telecommunications System (UMTS); Multimedia Broadcast/Multicast Service (MBMS); Stage 1, (3GPP TS 22.146 version 5.2.0 Release 5) 15 pages.

Chinese Office Action dated Mar. 7, 2008, 2 pages filled in First Office Action form in English, 18 pages English translation of Text of First Office Action and 10 pages Chinese originals of both the form and the Text of the First Office Action.

Tdoc S4-040092; 3GPP TSG-SA4#30 Meeting, Feb. 23-27, 2004, Malaga, Spain "Point-to-point repair for MBMS downloading" 6 pages.

Tdoc S4-030772; 3GPP TSG-SA4#29 Meeting, Nov. 24-28, 2003, Tampere, Finland "Flute for MBMS downloading" 10 pages.

"Forward Error Correction (FEC) Building Block" Network Working Group, Request for Comments: 3452, Category: Experimental, 12 pages, Dec. 2002.

* cited by examiner

CONVEYING PARAMETERS FOR BROADCAST/MULTICAST SESSIONS VIA A COMMUNICATION PROTOCOL

FIELD OF THE INVENTION

This invention relates to a method, a computer program, a computer program product, a system, a sender, a receiver and a protocol for transmitting common data from one sender to a plurality of receivers within a transmission session.

BACKGROUND OF THE INVENTION

Broadcast/multicast services are services intended to provide flexible and efficient mechanisms to send common (the same) information from one sender to multiple receivers.

In the context of a wireless communication system, the Multimedia Broadcast/Multicast Service (MBMS) is used in the Universal Mobile Telecommunications System (UMTS) as standardized by the Third Generation Partnership Project (3GPP).

In the 3GPP MBMS, the broadcast service describes a unidirectional point-to-multipoint transmission of multimedia data (e.g. text, audio, picture, video) from a single source entity (the sender) to all users (the receivers) in a broadcast area or areas. The broadcast mode is intended to efficiently use radio/network resources, e.g. data is transmitted over a common radio channel. Data is transmitted to broadcast areas as defined by the network.

A broadcast service received by the user may involve one or more successive broadcast sessions. A broadcast service might, for example, consist of a single on-going session (e.g. a media stream) or may involve several intermittent sessions over an extended period of time (e.g. messages).

An example of a service using the broadcast mode could be advertising or a welcome message to the network. As not all users attached to the network may wish to receive these messages then the user shall be able to enable/disable the reception of these broadcast services on his User Equipment (UE).

The broadcast mode differs from the multicast mode in that there is no specific requirement to activate or subscribe to the MBMS in broadcast mode.

The multicast mode of the 3GPP MBMS allows the unidirectional point-to-multipoint transmission of multimedia data (e.g. text, audio, picture, video) from a single source point to a multicast group in a multicast area. The multicast mode is intended to efficiently use radio/network resources, e.g. data is transmitted over a common radio channel. Data is transmitted to multicast areas as defined by the network. In the multicast mode there is the possibility for the network to selectively transmit to cells within the multicast area, which contain members of a multicast group.

A multicast service received by the UE may involve one or more successive multicast sessions. A multicast service might, for example, consist of a single on-going session (e.g. a multimedia stream) or may involve several intermittent multicast sessions over an extended period of time (e.g. messages). An example of a service using the multicast mode could be a football results service for which a subscription is required.

Unlike the broadcast mode, the multicast mode generally requires a subscription to the multicast subscription group and then the user joining the corresponding multicast group. The subscription and group joining may be made by a Public Land Mobile Network (PLMN) operator, the user or a third party on their behalf (e.g. company).

The File Delivery over Unidirectional Transport (FLUTE) protocol being available as Internet draft from the Internet Engineering Task Force (IETF) (at http://www.ietf.org/internet-drafts/) represents a protocol for the unidirectional delivery of files over IP (Internet Protocol) based networks, which is particularly suited to multicast networks, wherein common data is sent from one IP based entity to a plurality of IP based hosts. The FLUTE specification builds on the Asynchronous Layered Coding (ALC) protocol, the base protocol designed for massively scalable multicast distribution. FLUTE is applicable to the delivery of large and small files to many IP based hosts, using delivery sessions of several seconds or more. For instance, FLUTE could also be used for the delivery of large software updates to many IP based hosts simultaneously. It could also be used for continuous, but segmented, data such as time-lined text for subtitling.

However, when trying to make the services of the FLUTE protocol (offered to IP basedhosts) available to 3GPP MBMS, in order to grant the mobile receivers in a wireless communication system access to broadcast/multicast content that is originally located in an IP based network, the problem arises that a plurality of parameters that are required for the establishment of a broadcast/multicast session, wherein common content from a source entity located in the IP based network shall be transmitted to said mobile receivers partly over the IP based network and partly over the wireless network at least partially under the control of the FLUTE protocol, cannot be made available to the mobile receivers. For instance, it is currently not possible to provide the mobile receivers with information on the Forward Error Correction (FEC), on data repair capabilities in case of content damage during a broadcast/multicast session, on congestion control, on the use of multiple channels and on content description used by the FLUTE Protocol, resulting in the fact that these functionalities cannot be performed at both ends of the broadcast/multicast transmission path.

SUMMARY OF THE INVENTION

Setting out from this problem encountered in the specific context of broadcast/multicast transmission of IP-originated common content to mobile receivers in a wireless communication system, it is, inter alia, a general object of the present invention to provide a method, a computer program, a computer program product, a system, a sender, a receiver and a protocol that allow the communication of parameters, which are related to a transmission of common data from a sender to a plurality of receivers within a transmission session, to said plurality of receivers.

A method is proposed for transmitting common data from one sender to a plurality of receivers within a transmission session, comprising communicating at least one session parameter, which is related to said transmission of said common data within said transmission session, to said plurality of receivers via a communication protocol, and transmitting said common data from said sender to said plurality of receivers within said transmission session.

Said common data may comprise all kinds of information that can be represented in electronic form, for instance text, audio, images and video. Said common data may be streaming data, which is continuously transmitted from said sender to said plurality of receivers in a synchronized manner, or non-streaming data. Said data is common, i.e. the same data is transmitted to each receiver of said plurality of receivers in a point-to-multipoint fashion. Said transmission of said common data may take place in a wire-bound or in a wireless network, or in a combination thereof. The sender thus may for instance be an Internet server, and the receivers may be IP based hosts. Equally well, said receivers may also be mobile receivers in a wireless network. Said receivers may be of the same type or of different types. Said transmission of said common data takes place within a transmission session that may be of limited duration.

Said at least one session parameter is related to said transmission of said common data within said transmission session. Said at least one session parameter may for instance describe the error protection, channel coding, modulation and/or interleaving that is used for said transmission of said common data. Said at least one session parameter may equally well comprise information related to delay or memory constraints imposed on the receivers, on the content of the common data, on congestion control, on error recovery, or on any other topic related to the correct transmission and reception of said common data. For instance, information on a repair session that may be required subsequent to said transmission of said common data if said common data is not correctly received at one or several receivers and thus has to be at least partially re-transmitted within a repair session may be contained in said at least one session parameter.

Said at least one session parameter is communicated to said plurality of receivers via a communication protocol. Said communication protocol may for instance be the Session Description Protocol (SDP), the File Transfer Protocol (FTP), the Hypertext Transport Protocol (HTTP), the Short Message Service (SMS), the General Packet Radio Service (GPRS) or similar protocols. Said at least one session parameter may for instance be communicated in protocol data units that are exchanged between communication protocol entities in different peers, wherein one peer may be the sender, and another peer may be one of said plurality of receivers. Said communication protocol may be particularly specified or defined for the communication of said at least one session parameter.

The deployment of said communication protocol to communicate said session parameters to said plurality of receivers thus makes it possible to provide said receivers with information on said transmission session that may be vital for the proper functioning of said transmission session.

According to the method of the present invention, it may be preferred that said at least one session parameter is communicated to said plurality of receivers before or during the establishment of said transmission session. The receivers then are provided with said at least one session parameter, which is related to said subsequent transmission of said common data within said transmission session, early enough so that a proper reception of said common data at said plurality of receivers is possible.

According to the method of the present invention, it may be preferred that said communication protocol is a Session Description Protocol (SDP).

Said SDP may be intended for describing multimedia sessions for the purposes of session announcement, session invitation, and other forms of multimedia session initiation.

Said SDP may provide a standard representation for the description of media details, transport addresses and other session description metadata being required when initiating multimedia teleconferences, voice-over-IP calls, streaming video, or other real-time sessions. Said session description metadata provided by said SDP may be conveyed to the participants of the multimedia sessions before the actual multimedia session takes place. Said SDP may be independent on the actual way in which information is transported. Said SDP may purely be a format for session description without incorporating a transport protocol, and may be intended to use different transport protocols as appropriate, including for instance the Session Announcement Protocol (SAP), the Session Initiation Protocol (SIP), the Real-Time Streaming Protocol (RTSP), or the Hypertext Transport Protocol (HTTP). Said SDP may be intended to be general purpose so that it may be used in a wide range of network environments and applications. Said SDP may for instance be operated by SDP protocol entities in said sender (or another instance such as a content server or similar) and SDP protocol entities in said plurality of receivers.

Said SDP may for instance be the SDP that is defined by the Internet Engineering Task Force (IETF).

Said at least one session parameter is communicated to said plurality of receivers via said SDP. This may for instance be achieved by a plurality of attribute fields that are defined by said SDP, wherein each attribute field may be capable of incorporating the information of one or more session parameters.

According to the method of the present invention, it may be preferred that said common data is transmitted from said sender to said plurality of receivers at least partially over an IP based network. For instance, said sender may be an Internet server or a similar instance within the Internet, and said receivers may be mobile receivers of a wireless communication system the core network of which is connected to the Internet and thus to said sender.

According to the method of the present invention, it may be preferred that said common data is transmitted from said sender to said plurality of receivers in a broadcast or multicast operation. In any case, point-to-multipoint operation takes place.

According to the method of the present invention, it may be preferred that said common data is streaming data or non-streaming data. Streaming data may be characterized as data that is continuously and in a synchronized manner transmitted from said sender to said plurality of receivers, for instance in the form of streaming video or audio.

According to the method of the present invention, it may be preferred that said common data is real-time data or non-real-time data.

According to the method of the present invention, it may be preferred that said common data is transmitted from said sender to said plurality of receivers at least partially over a wireless network. For instance, said receivers may be mobile receivers in a wireless communication network that is connected to a sender residing on an IP based network. Said wireless network may for instance be a mobile radio communication network according to the Universal Mobile Telecommunications System (UMTS) standard, or a Wireless Local Area Network (W-LAN) such as IEEE 802.11 or HiperLAN/2, or a satellite-based network.

According to the method of the present invention, it may be preferred that said wireless network is a mobile network that at least partially implements a Multimedia Broadcast/Multicast Service MBMS as defined by the Third Generation Partnership Project 3GPP.

According to the method of the present invention, it may be preferred that said communication protocol contains a Forward Error Correction (FEC) attribute that specifies at least an FEC encoding scheme that is used for said transmission of said common data within said transmission session.

Said attribute contained in said communication protocol may be a primary means for extending said communication protocol, and may be defined to be used as "session-level" or "media-level" attribute, or both. Said attribute may add information about the media stream. It may further also convey additional information that applies to said transmission session as a whole rather than to individual media. Attributes may be either property attributes or value attributes.

Said FEC encoding scheme said FEC attribute specifies may for instance be an Automatic Repeat Request (ARQ) scheme.

According to the method of the present invention, it may be preferred that said FEC attribute further specifies an FEC encoding identifier. Said FEC encoding identifier may contain information on an FEC decoding matrix or FEC bytecode.

According to the method of the present invention, it may be preferred that said communication protocol contains an FEC machine attribute that specifies the location from which FEC decoding information can be downloaded.

According to the method of the present invention, it may be preferred that said FEC decoding information such as an FEC decoding matrix or FEC bytecode has to be downloaded from said location by at least one of said plurality of receivers in an error-free fashion.

According to the method of the present invention, it may be preferred that at least one of said plurality of receivers uses a Hypertext Transport Protocol (HTTP) or a Transport Control Protocol (TCP) based point-to-point connection to download said FEC decoding information.

According to the method of the present invention, it may be preferred that at least one of said plurality of receivers uses a time dispersion function to determine a time when the downloading of said FEC decoding information from said location starts or determine the time when to start a repair session. This time dispersion function may reduce the number of receivers that may concurrently attempt to download said FEC information from said location or perform repair sessions, for instance by prescribing a randomized starting time for said download.

According to the method of the present invention, it may be preferred that said communication protocol contains an FEC buffering attribute that specifies the buffering requirements imposed on said plurality of receivers during the transmission of said common data from said sender to said plurality of receivers in said transmission session.

According to the method of the present invention, it may be preferred that said buffering requirements are a buffering delay and/or a buffering memory size.

According to the method of the present invention, it may be preferred that said communication protocol contains a congestion control attribute that specifies a congestion control scheme that is used for said transmission of said common data within said transmission session.

According to the method of the present invention, it may be preferred that in a case that said common data is not correctly received in at least one of said plurality of receivers, at least parts of said common data are transmitted from a repair server to said at least one receiver within a repair session.

According to the method of the present invention, it may be preferred that said repair session is a point-to-point or a point-to-multipoint repair session.

According to the method of the present invention, it may be preferred that said communication protocol contains a repair Uniform Resource Identifier URI attribute that specifies a URI of said repair server.

According to the method of the present invention, it may be preferred that said communication protocol contains a repair threshold attribute that specifies an error threshold, and that said error threshold is related to a reception quality of said common data as received by said plurality of receivers from said sender within said transmission session. Said error threshold may for instance quantify a maximum tolerable number of bit errors per packet or time.

According to the method of the present invention, it may be preferred that an entering into said repair session by one of said plurality of receivers depends on the relationship between a reception quality of said common data as received by said receiver from said sender within said transmission session and said error threshold. If for instance said receiver receives said common data during said transmission session with an error of 10 bytes in a window of 300 seconds, and if said error threshold states that only up to 1 byte error in a window of 300 seconds is allowed in order to start the repair session, said receiver may refrain from entering said repair session.

According to the method of the present invention, it may be preferred that said error threshold is quantified in terms of an error unit, an error value, a measurement window unit and a measurement window value. Said error unit may for instance be bytes, bits, packets or a percentage, said error value may be a real-valued number, said window unit may for instance be seconds, packets, bits or bytes and said window value may be a real-valued number. An example of an error threshold quantified in this manner may thus be 10 erroneous bytes in a window of 300 seconds or a similar combination.

According to the method of the present invention, it may be preferred that said error threshold is quantified in terms of an error value. It may also be possible to specify said error threshold by a real-valued error value, for instance 0.01. The error unit, the measurement window unit and the measurement window value may then for instance be pre-defined.

According to the method of the present invention, it may be preferred that a plurality of error thresholds is used for said transmission session, and wherein said error thresholds are explicitly or implicitly labelled. Said error threshold may for instance be explicitly labelled with an integer, so that a first, second, etc. error threshold may be differentiated. Said error threshold may equally well be inherently labelled, for instance by prescribing that the error thresholds are sorted according to their value and then labelled in ascending (or alternatively in descending) order, starting with the lowest or highest error threshold. Labelling error thresholds is particularly advantageous when different backoff modes, which may for instance describe how long a receiver has to wait until a request for a repair session may be started, are supported and when each error threshold then corresponds to a respective backoff mode. The entrance of receivers into a repair session then may be controlled depending on the magnitude of the reception errors, so that, for instance, receivers with large reception errors enter said repair session at first or at last.

According to the method of the present invention, it may be preferred that said communication protocol contains a backoff-mode attribute that provides information on when a receiver that did not correctly receive said common data from said sender within said transmission session can start a request for said repair session.

According to the present invention, it may be preferred that said communication protocol contains a backoff-mode attribute that specifies a backoff mode, wherein said backoff mode provides information on when a receiver that did not correctly receive said common data from said sender within said transmission session can start a request for said repair session, wherein a plurality of backoff modes is used for said transmission session, and wherein at least one of said error thresholds is linked to at least one of said backoff modes, respectively. For instance, each error threshold may then be linked to a respective backoff mode. This linking may for instance be achieved by labelling both the error thresholds and the backoff modes, so that corresponding labels are understood to represent a link.

According to the present invention, it may be preferred that said backoff modes are assigned to a receiver in dependence on the relationship between a reception quality of said common data as received by said receiver during said transmission session and a reception quality as demanded by said error thresholds. Based on the error rate that is experienced by a receiver during the reception of said common data within said transmission session, and the linking between said error thresholds and said backoff modes, it may then be possible to assign a backoff mode to said receiver. In this way, for instance receivers with a high error rate (above a first error threshold) are assigned to a first backoff mode, and receivers with a lower error rate, below the first error threshold but above a second error threshold, are assigned to a second backoff mode. The receivers in the first backoff mode then may be allowed to transmit before or after the after the receivers in the second backoff mode, thus allowing for a Quality of Service (QoS) control.

According to the method of the present invention, it may be preferred that said information is represented by a backoff unit, a backoff value and a backoff window. Said backoff unit may for instance be a relative time in seconds, an absolute Network Time Protocol (NTP) time, bytes, bits or packets. Said backoff value may for instance be a real-valued number. Said backoff window may for instance be a real-valued number with a unit that may be the same as the unit specified by said backoff unit. Said information may be related to an absolute or relative time basis. As an example, if said backoff unit is seconds, said backoff value is 60 and said backoff window is 120, this may indicate that a receiver may start a request for a repair session between 60 and 180 (=60+120) seconds from the end of the transmission session, wherein said starting time may be randomly chosen from said interval between 60 and 120 seconds, for instance based on a uniform distribution.

According to the method of the present invention, it may be preferred that said information is represented by a variable that indicates if absolute or relative timing is used, and a time value. For instance, if said variable indicates that an absolute timing is used, said time value may specify an absolute NTP time at which a request for a repair session may be started (or around which or starting from which a starting time may be randomly chosen). Alternatively, if said variable indicates that a relative timing is used, said time value may for instance specify that said request may be randomly started in an interval starting with the end of the transmission session and ending after a duration as indicated by said time value. Said time value may also be defined as a maximum repair availability time, i.e. the time until the repair operation is possible, and then may be preferably expressed in NTP time, enabling a so-called lazy repair.

According to the method of the present invention, it may be preferred that said information comprises an error threshold and three values X, Y and Z, and that at least one of said plurality of receivers, if a reception quality of said common data as received by said at least one receiver from said sender within said transmission session is better than a reception quality dictated by said error threshold, said request for said repair session is started randomly within a time interval of duration X, wherein said interval starts at the end of said transmission session; and otherwise starting said request for said repair session randomly within a time period between Y and Y+Z, wherein Y is counted from the end of said transmission session.

According to the method of the present invention, it may be preferred that said communication protocol can be used to communicate the number of said plurality of receivers to said plurality of receivers. Information on the number of receivers may be advantageously used by said receivers when determining backoff times for said repair session.

According to the method of the present invention, it may be preferred that said communication protocol contains a repair type parameter attribute that specifies if said repair session can be a point-to-point session, a point-to-multipoint session, or both.

According to the method of the present invention, it may be preferred that said communication protocol contains a repair token attribute that specifies the type of said repair session, and/or information on which parts of said common data that is not correctly received at least one of said plurality of receivers within said transmission session will be transmitted from said repair server to said at least one receiver within said repair session. Said information on said parts may for instance specify a file identifier, a Source Block Number (SBN) and/or Encoding Symbol ID (ESI) of said common data, or pairs or ranges based on these values.

According to the method of the present invention, it may be preferred that said communication protocol contains a content description attribute that specifies how said sender indicates to said plurality of receivers the URI where a content description of said common data is stored. Said URI may for instance be an Extended Markup Language (XML) scheme such as an File Delivery Table (FDT) XML schema, or an entry point to an Internet Media Guide (IMG) data model, or another entry point to a schema or model.

According to the method of the present invention, it may be preferred that said transmission of said common data from said sender to said plurality of receivers is at least partially controlled by a File Delivery Over Unidirectional Transport FLUTE protocol. Said FLUTE may represent a protocol for the unidirectional delivery of files over the Internet, which may be particularly suited to multicast networks. Said FLUTE protocol may be based on Asynchronous Layered Coding (ALC).

According to the method of the present invention, it may be preferred that said communication protocol contains a FLUTE channel attribute that specifies how many channels are used by the sender to transmit said common data to said plurality of receivers within said transmission session.

According to the method of the present invention, it may be preferred that said communication protocol contains a FLUTE Transmission Session Identifier TSI attribute that specifies the value of a TSI within said transmission session.

According to the method of the present invention, it may be preferred that said communication protocol contains a media description that specifies a media that is used within said transmission session. This media description may also be referred to as "m-line". For instance, said media may be audio, video, application, data and control. Said media description may for instance describe that video data is transported on a channel that uses FLUTE over a User Datagram Protocol (UDP).

According to the method of the present invention, it may be preferred that said communication protocol contains a connection data that specifies an address of a channel used within said transmission session. This connection data may also be referred to a "c-line". Said connection data may comprise a network type, an address type and a connection address. This connection data thus may, for instance, indicate an IPv6 address.

Further proposed is a computer program with instructions operable to cause a processor to perform the above-described method steps. Said processor may for instance be integrated in said sender, receiver, or both.

Still further proposed is a computer program product comprising a computer program with instructions operable to cause a processor to perform the above-described method steps.

Further, a system is proposed for transmitting data, comprising at least one sender and a plurality of receivers, wherein said at least one sender and said plurality of receivers comprise means arranged for communicating at least one session parameter, which is related to said transmission of said common data within said transmission session, from said at least one sender to said plurality of receivers via a Session Description Protocol communication protocol; and wherein said at least one sender and said plurality of receivers comprise means arranged for transmitting said common data from said sender to said plurality of receivers within said transmission session.

Further still, a sender is proposed for transmitting common data to a plurality of receivers within a transmission session, the sender comprising means arranged for communicating at least one session parameter, which is related to said transmission of said common data within said transmission session, to said plurality of receivers via a Session Description Protocol communication protocol, and means arranged for transmitting said common data to said plurality of receivers within said transmission session.

Still further, a receiver is proposed for receiving common data that is transmitted from one sender to a plurality of receivers within a transmission session, comprising means arranged for receiving at least one session parameter, which is related to said transmission of said common data within said transmission session, and which is communicated to said plurality of receivers via a Session Description Protocol communication protocol, and means arranged for receiving said common data that is transmitted from said sender to said plurality of receivers within said transmission session.

Further still, a Session Description Protocol is proposed, comprising a definition of at least one session parameter that is related to a transmission of common data from a sender to a plurality of receivers within a transmission session.

These and other aspects of the invention will be apparent from and elucidated with reference to the embodiments described hereinafter.

DETAILED DESCRIPTION OF THE INVENTION

The present invention proposes to deploy a communication protocol in order to communicate session parameters to a plurality of receivers that are to receive common data from a sender via a point-to-multipoint connection. In the description which follows below, without limiting the scope of the present invention, as an example for such as communication protocol, a Session Description Protocol SDP will be used for this purpose. To this end, said SDP contains attributes, media descriptions and connection data that are defined to allow for the communication of said session parameters. In what follows, the definition of these SDP components will be exemplarily illustrated for a system that offers the Third Generation Partnership Project (3GPP) Multimedia Broadcast/Multicast Services for sessions that are controlled by the File Delivery over Unidirectional Transport (FLUTE) protocol as defined by the Internet Engineering Taskforce (IETF). It should be noted that the application of the present invention to this system and the following component definitions are by no means intended to restrict the scope of the invention to this specific application. The components are defined based on Augmented Backus-Naur Form (ABNF) syntax description format.

1. FEC Parameters

The Forward Error Correction (FEC) attribute describes the FEC encoding scheme used. The FEC attribute describes also the FEC encoding identifier (and its association with the FEC encoding scheme used). For example, in the IETF FLUTE protocol draft, a description of the FEC encoding ID for the FLUTE protocol is given. There may be multiple encoding identifiers associated to an FEC encoding scheme.

An example syntax for the FEC attribute according to the present invention is given below as:

```
a=FEC-Info:"{"value *(","value)"}" CRLF
wherein
value = value-single / value-couple
value-single = %d0-127
value-couple = "(" %d128-255 "," %d0-255 ")"
```

Therein, value is a numerical value representing the FEC Encoding scheme used. value-single represents the FEC Encoding scheme (with values between 0 and 127 in this example). value-couple represents a (FEC Encoding scheme, FEC encoding-ID) pair (with values respectively between 128 and 255 for the FEC encoding scheme, and between 0 and 255 for the encoding-ID in this example).

The FEC attribute may preferably be a session level-only attribute (however, it is not excluded to use it as media-level attribute).

The value-single and value-couple examples given may be the preferred syntax. However, other options, such as value-single=% d0-255 or value-couple="("% d0-255", "% d0-255")", are also in scope of this invention.

When no such attribute is present among the SDP descriptors, then this may indicate that no FEC is being used by the descriptor (for example, Compact NOCODE FEC is being used, as stated in the IETF FLUTE protocol draft). This is equivalent to using the descriptor a=FEC-Info: {0}.

An example for the use of the FEC attribute according to the present invention is:

a=FEC-Info: {0, 64, 127, (128,3), (128,4), (129,3)}

The sender indicates in the above example that multiple FEC IDs are used. The numbers 0, 64, 127 and so on, signify these FEC IDs. The sender does not need to map these to specific channels of the FLUTE session.

A further example for the use of the FEC attribute according to the present invention is:

a=FEC-Info: {0}

The sender indicates in the above example to the receiver that it is using Compact no code FEC. It may also be possible to use only this parameter to indicate FEC IDs 0 to 127 (that are fully specified). However, the sender may also choose to use two parameters to specify that FEC IDs 0 to 127 may be used, e.g., a=FEC-Info: {0, 0}) describes FEC ID 0 and FEC Instance 0 (where the Instance information is redundant information in the best mode for FEC IDs 0-127). The limitation of only a single (FEC encoding ID) parameter for FEC encoding IDs 0-127 being useful is specified by ALC version 1. However, the use of a second parameter (FEC Instance ID) for FEC encoding IDs 0-127 may also be envisaged according to the present invention to further extend the number of fully specified FEC schemes, which may be signalled.

2. FEC Machine Parameters:

In case a universal FEC machine is used (i.e., a system that allows to download the FEC scheme or the FEC decoding matrix to the receivers before starting a session), the sender must signal the exact location of the FEC decoding matrix or the FEC bytecode to be downloaded from the receiver in order to decode the data that are going to be transmitted on the multicast/broadcast channel.

Downloading of this data advantageously is performed in error free fashion, preferably (but not limited to) via an HTTP/TCP point-to-point connection. If the bytecode or the FEC matrix are not delivered error-free to the receivers, it might be difficult for the receiver to correctly receive the common data within a multicast/broadcast session.

According to the present invention, the sender may signal the location of the FEC file during the SDP session announcement and thus before the session starts. It may be advantageous that the receivers fetch the error-free FEC file before the start of the session, in order to get the system ready for decoding the data. In order to avoid network overload due to the many receivers' requests for FEC file downloading, the receivers may start this point-to-point downloading with a randomized starting time. This time may for instance be computed by the receivers between the time 0 (when the session description is received via said SDP) and the time indicated as session start time in the (first) t parameter value contained in the same session description.

An example syntax for an FEC machine attribute according to the present invention is given in below as:

```
a=FEC-machine: FILE-ID
wherein
FILE-ID = <"> textstring <">
textstring = 1*((0x01..0x09) / 0x0b / 0x0c /
0x0e..0x21)
            / (0x023..0xff))
            ;any byte except NUL, CR, LF, ' " '
```

The FEC machine attribute may preferably be a session level-only attribute. It is however not excluded to use it as media-level attribute.

There may be multiple FEC machine attribute definitions (i.e. a=FEC-machine lines). In this case, the receivers may randomize not only in the time dimension, but also based on the multiple FEC-machine locations.

An example for the use of the FEC machine attribute according to the present invention is:
a=FEC-machine: "http://www.fec.com/matrix.fec"

In this example, the receiver fetches the FEC matrix file from the address above.

3. FEC Buffering Parameters

The FEC buffering attribute describes the requirements or constraints imposed by a FEC encoding scheme to the receivers when receiving a multicast/broadcast data stream. These constraints may for instance be in terms of a first parameter additional delay (i.e., latency expressed in the time dimension, e.g., in milliseconds) and/or a second parameter memory requirement (i.e., number of bytes required at the receivers to perform FEC decoding).

The first parameter is advantageously applicable to real-time sessions (such as multicast media streaming sessions). It may be used to guarantee real-time and pause-less decoding of FEC-encoded media data, and playback at the receivers.

The second parameter is advantageously applicable to real-time sessions, but also to non-real-time sessions (e.g., file download sessions). It may be used by a receiver to determine its terminal capabilities against the session requirements, and to allocate an adequate amount of memory to enable efficient FEC data decoding.

Both parameters may preferably be session level-only attributes. It is however not excluded to use them as media-level attributes.

It may not be required that both parameters are present in the FEC buffering attribute description. Also, a reference to a previous FEC attribute may be created, by giving the FEC encoding scheme used.

An example syntax for an FEC buffering attribute according to the present invention is given below as:

```
a=FEC-Buf:"{"(scheme-value)"," 0*1(delay-value)","
0*1(memory-value)"}" CRLF
wherein
scheme-value= %d
delay-value=%d
memory-value=%d
```

Examples for the use of the FEC buffering attribute according to the present invention are given in the sequel.

Example 1 a=FEC-Buf: {127, 500, 1000000}

In this example, the sender tells to the receiver(s) that the FEC scheme 127 produces 500 ms delay and requires 1000000 bytes of memory.

Example 2 a=FEC-Buf: {127, 500,}

In this example, the memory requirement parameter is missing.

Example 3 a=FEC-Buf: {127, 1000000}

In this example, the delay parameter is missing.

4. Congestion Control Parameters

The congestion control attribute describes the congestion control scheme used.

An example syntax for a congestion control attribute according to the present invention is given in below as:

```
a=Congestion-Control-ID: value CRLF
wherein
value = %d / <"> textstring <">
textstring = 1*((0x01..0x09) / 0x0b / 0x0c /
(0x0e..0x21)
       /(0x023..0xff))
       ;any byte except NUL, CR, LF, ' " '
```

Therein, value may be a numerical or alpha-numerical value representing the Congestion Control scheme used. This may be a session level-only attribute.

5. Repair Parameters

These may preferably be session-level-only attributes. It is however not excluded to use them as media-level attributes. In the description which follows below, four attributes related to repair parameters will exemplarily be defined.

5.1 URI of the Repair Server

The URI of the repair server attribute describes the address of the repair server to be used by the receivers for establishing a point-to-point or point-to-multipoint repair session.

An example syntax for the repair URI attribute according to the present invention is given below as:

```
a=repair-URI: "uri=" <">URI <">CRLF
wherein
URI = as defined in Request for Comments (RFC) document
2396
```

Therein, URI is a valid URI for the repair server, which may be used by the receivers to establish a repair session.

There may be several instances of the "a=repair-URI" attribute at the session level. The client may select the suitable server based on the following criteria:
- Server's IP domain (e.g. network topology-wise closest repair server), or
- random.

An example for the use of the repair URI attribute according to the present invention is:
a=repair-URI: uri="www.repairserver.com"

The sender indicates in the above example the repair server to be used by the receivers to establish a point-to-point repair session in the case that the entire session is not received correctly.

5.2 Error Rate Repair Threshold

The definition of SDP attributes related to an error rate repair threshold includes two aspects as described below.

5.2.1 First Aspect: Usage of Four Values

The error rate repair threshold attribute may describe a threshold beyond which the receivers should not request repair requests.

An example syntax for the repair threshold syntax is given below as

```
a=repair-threshold:"(" value1"," value2 "," value3 ","
value4 ")"
wherein
value1 = %d
value2 = %d / float-value
value3 = %d
value4 = %d / float-value
float-value = 1*DIGIT [ "." 1*DIGIT]
```

Therein, value1 is the error unit used for the error rate threshold. An example of the values that could be used for this purpose is:

| | |
|---|---|
| value1 = 0; | bytes (per second) |
| value1 = 1; | bits (per second) |
| value1 = 2; | packets (per second) |
| value1 = 3; | percentage (e.g., of lost bytes or packets) (per second) |

Other values of the error unit are also possible. For example, the same error units could be defined without the "per second" indication:

| | |
|---|---|
| value1 = 0; | bytes |
| value1 = 1; | bits |
| value1 = 2; | packets |
| value1 = 3; | percentage (e.g., of lost bytes or packets) | value2 is the error value. For instance, a value of 10 minutes, 2 Million bytes or 30 packets could be used for this. This parameter should be user-defined.

value3 is the measurement window unit. An example of values that could be used for this purpose is:

| | |
|---|---|
| value3 = 0; | the measurement window unit is in seconds. |
| value3 = 1; | the measurement window unit is in packets. |
| value3 = 2; | the measurement window unit is in bits. |
| value3 = 3; | the measurement window unit is in bytes. | value4 is the quantity of the measurement window value. This parameter describes the value of the measurement window. For instance, if value3=0 and value4=4, this indicates a measurement window of 4 seconds.

Thus, when using the "per second" indication, if value1=0, value2=10, value3=0 and value4=300, this signifies that the threshold is an error of 10 bytes per second in a window of 300 seconds. If the receiver observes errors beyond this threshold, then it may be obliged to react as required.

Also, when not using the "per second" indication, if value1=0, value2=10, value3=0 and value4=300, this signifies that the threshold is an error of 10 bytes in a window of 300 seconds. If the receiver observes errors beyond this threshold, then it may be obliged to react as required.

In a preferred operation that uses multiple error thresholds, these may be implicitly labelled in incremental order (0, 1, 2, . . . n) according to the most challenging error threshold criteria (i.e., the lowest error rate threshold) to the least challenging (i.e., the highest error rate threshold). Such that, to experience reception with an error rate below the highest error rate (e.g., less than a threshold of 0.000001 bits per second) would be identified as error rate 0, to the next most challenging criteria (e.g., less than 0.01 bits per second, but more than 0.000001) would be identified as error rate 1 and so on until the least challenging reception criteria (exceeding all the thresholds) earns the label "error rate n". Note that, the number of thresholds specified is n+1 according to this labelling and may be invariable. The significance of this virtual labelling is to map the error thresholds to the different back-off modes that might be employed.

To anyone skilled in the art, it will be clear that several enumerations of value1, value2, value3, and value4 are possible and are within the scope of this invention. For example value3=0 (measurement window unit is in packets); value3=1 (measurement window unit is in seconds) is a different enumeration to the one in the example above.

It is important to note that several value quadruples may be given. One example is a=repair-threshold: "(A,B,C,D) (W,X,Y,Z)". Another example is a=repair-threshold: "(A,B,C,D)" followed by a=repair-threshold: "(W,X,Y,Z)". This may enable a host to understand multiple threshold values. In a preferred embodiment using multiple thresholds, the threshold values may be linked to back-off modes, as will be explained in more detail below. A simple an elegant method for this would be that the order of the quadruple determines the mode of behaviour of the receiver. Thus, (exceeding) the first threshold specified (threshold 1) corresponds to the first back-off mode specified (back-off 1) and so on.

An example for the use of this repair threshold attribute according to the present invention is:
a=repair-threshold: (0, 10, 0, 300)

In this example, the sender indicates the receivers that the repair threshold is 10 bytes per second with a window of 300 seconds.

5.2.2 Second Aspect: Usage of One Value

It is important to point out that the syntax example comprising four values is not restricting the applicability of the error threshold attribute for more simple cases. For instance, also the usage of a single value may be possible, as is exemplarily depicted below as:

```
a=repair-threshold: value
wherein
value = %d / float-value
float-value = 1*DIGIT [ "." 1*DIGIT]
```

It is important to underline that there exist a mapping between the first aspect (four values, see above clause 2.1) and the second aspects (one value, see present clause 2.2), in that the second aspect represents a specialization of the first aspect. In fact, it is possible to express simple error rates (such as 5%) according to both the first and second aspect of this invention.

An example for the use of this repair threshold attribute according to the present invention is:
a=repair-threshold: 5

In this example, if it is clear that the error rate is measured in units of packet loss rate, then the sender indicates to the receivers that the repair threshold is 5% packet loss rate.

5.3 Back-Off Modes

Three possible definitions for a back-off mode attribute, depending on the number of parameters, will be presented below (5.3.1, 5.3.2, and 5.3.3).

5.3.1 First Back-off Mode Attribute

The back-off mode attribute (equivalent names may be suppression mode, response timing mode, time dispersion function, or time spread function) describes the way a sender tells the receivers when to start the request for repair operation, or how to compute this starting time. This may include the signalling of a single value (in time units) over which the receivers may randomize the repair request starting time, or a set of values that might enable a receiver to compute the repair starting time (e.g., a more complex set of thresholds or the number of receivers involved in the multicast transmission).

A scheme similar to the one defined for the error rate threshold may also be used with a set of modes. An example syntax for a backoff mode attribute according to the present invention is given below as:

```
a=backoff-mode:"("value1", "value2", "value3")"
wherein
value1 = %d / float-value
float-value = 1*DIGIT [ "." 1*DIGIT]
value2 = %d
value3 = %d
```

Therein, value1 is the measurement unit. An example of values that could be used for value1 is:

| | |
|---|---|
| value1 = 0; | the unit the relative time in seconds, |
| value1 = 1; | the unit is the absolute NTP time, |
| value1 = 2; | the unit is bytes, |
| value1 = 3; | the unit is bits, or |
| value1 = 4; | the unit is packets. | value2 is the measurement value. For instance, 10 seconds, 20 bytes, 30 packets. This value may represent an offset value and may be negative. It should be noted that for a measurement of time, this value can be absolute or relative. Where session lengths are of finite and relatively short time, the best mode for relative may be relative to the end of the session (as advertised in the descriptor). For never ending sessions (not MBMS), the end of another entity (such as the end of a transmission object signalled by a transport header flag) may be used.

value3 represents a window. The unit for this may be the same as for value2, i.e. that defined by value1.

In an alternative embodiment of this invention, a smaller number of parameters than three may also be possible. For instance, the presence of only 2 parameters may indicate that it is defaulted to relative time. Likewise, just one parameter could indicate relative time with zero offset.

For example, a=backoff-mode: (0, 60,120) would indicate that a device using this mode would calculate the time at which to send a message (e.g. repair request), preferably randomized with uniform distribution, between 60 seconds and 180 (=60+120) seconds from the end of the advertised session (or another relevant entity).

In a preferred operation, the back-off modes may be implicitly labelled in incremental order (0, 1, 2, . . . , m) according to the order of presentation in the description instance. Such that, the first mode described (e.g., from the start of an SDP file) would be identified as mode 0, the next to appear would be identified as mode 0 and so on until the last mode described earns the label "mode m". The significance of this virtual labelling is to map from the error rate threshold (as defined above), which may tell the receiver which mode to employ. Thus, if error rate 1 is experienced, the receiver may employ back-off mode 1. Good design may ensure that the number of modes (m+1) equals the number of error rate thresholds specified. However, to avert unnecessary error conditions: where n>m, the mode m may be used for all error rates m and greater; and where n<m the back-off modes n+1 to m may be silently ignored. Note that, the purpose of multiple modes depending on error rate criteria is to allow quick and slow repair types of service, which may maximize user perceived QoS over the whole multicast/broadcast group, by allowing the users with the least demanding repair requirement priority in repair scheduling. Thus, for this case, it may make sense to ensure that mode 0 provides the most timely-early-repair and mode m the least timely. However, this is not mandatory so that alternative schemes are also allowed.

For example, a=backoff-mode: (0, 0, 60), a=backoff-mode: (0, 60, 120) would indicate that a device using the first mode would send its message sometime between 0 and 60 seconds from the end of the session and a device using the second mode would send its message sometime between 60 and 120 seconds from the end of the session. The example shows non-overlapping message windows, although overlapping windows (across different modes) are also in the scope of this invention.

An alternative operation is to add a $4^{th}$ value to each back-off-mode line which may give the mode label either as an integer number—which may be mapped to error rate as above—or as some other label which requires a similar label to be either introduced to the error-threshold lines or a separate mapping descriptor to also be used.

An example for the use of this back-off mode attribute according to the present invention, in combination with the use of the repair threshold attribute, is
a=backoff-mode: (0, 0, 30)
a=repair-threshold: (1, 10, 0, 100)
a=backoff-mode: (0, 30, 60)
a=repair-threshold: (1, 20, 0, 100)
a=backoff-mode: (0, 60, 240)

In this example, if the error rate is less than 10 bits per second (over a 100 second sliding time window) then the receivers should randomize the starting time of the repair request between the end of the delivery session and 30 seconds. If the error rate is 10 bits per second or greater but less than 20 bits per second, then the receivers should wait 30 seconds after the end of the delivery session, and then randomize the repair request between the end of the 30 seconds waiting time and 60 more seconds (i.e. between 30 and 90 seconds after the end of the session). If the error rate is 20 bits per second or greater, then the receivers should wait 60 seconds after the end of the delivery session, and then randomize the repair request between the end of the 60 seconds waiting time and 240 more seconds (i.e. between 60 and 300 seconds after the end of the session).

Note that, the receiver interpretation of the above example is identical to that of this alternative ordering:
a=repair-threshold: (1, 10, 0, 100)
a=repair-threshold: (1, 20, 0, 100)
a=backoff-mode: (0, 0, 30)
a=backoff-mode: (0, 30, 60)
a=backoff-mode: (0, 60, 240)

5.3.2 Second Back-off Mode Attribute

An alternative back-off operation according to the present invention may obey the following rule:
if below the threshold error rate then
    "uniformly randomize the NACK(s) over a time period X, starting from the end of the initial delivery session"
else
    "must wait until after a certain time Y after the initial session ends, and then randomize the NACK(s) over a time period Z".

Therein, a negative-acknowledgement message (NACK) may for instance correspond to starting a request for a repair session.

This alternative back-off operation requires the description of some SDP parameters. Here the parameters are ERROR RATE, X, Y and Z, where ERROR RATE is expressed in the same units as the error rate threshold defined above, and X, Y, Z and expressed in units of time (e.g., in seconds). An example syntax for such a back-off mode attribute according to the present invention is provided below as:

```
a=backoff-mode:"("value1", "value2", "value3",
    "value4")"
wherein
value1 = %d / float-value
float-value = 1*DIGIT [ "." 1*DIGIT]
value2 = %d
value3 = %d
value4 = %d
```

Therein, value1 is the error rate as defined above in the error rate repair threshold. value2 is the back-off time if the error rate is below value, since the end of the delivery session. value3 is the waiting time in case the error rate exceed the threshold given by value1. value4 is the back-off time if the error rate is above value. It can be a displacement value relative from value3 after the end of the delivery session, or a displacement value relative to the end of the delivery session (in the latter case value4>value2).

Multiple a-lines with the back-off mode attribute define an array of conditions and are also possible.

Examples for the use of this back-off mode attribute are:

Example 1 a=backoff-mode: (5, 10, 20, 30)

In this example, if the error rate is less than 5%, the receivers should randomize the starting time of the repair request between the end of the delivery session and 10 seconds. If the error rate is greater than 5%, the receivers should wait 20 seconds after the end of the delivery session, and then randomize the repair request between the end of the 20 seconds waiting time and 30 seconds.

Example 2 a=backoff-mode: (5, 10, 20, 30)
a=backoff-mode: (10, 20, 30, 60)

This example contains multiple a lines with the same attribute. In addition to the rule defined in Example 2 for 5% error rate, the second rule is made for handling cases of 10% error rate, with similar semantics as in the previous example.

5.3.3 Third Back-off Mode Attribute

It is important to point out that the above syntax example is not restricting the applicability of the back-off mode attribute for simple cases. For instance, also the usage of a single value is possible, as is exemplarily given below as:
a=backoff-mode: "(" ["+"] value ")"
wherein
value=% d Therein, if "+" is used, a relative time from the reception of the SDP is considered. In this case, the sender may tell the receivers to start the repair session at a random time between the end of the session and value (expressed in seconds). If "+" is not used, then an absolute NTP time unit is used.

value may also be defined as the maximum repair availability time (the time until the repair operation is possible), and it may preferably expressed in NTP time. In this case a lazy repair might be enabled.

Furthermore, the sender may also signal via SDP the number of receivers that have joined a multicast session, being this a number that can be given in input (together with the random time above) to the function that calculates the back-off time for the start of the repair session.

Examples for the use of this back-off mode attribute are:

Example 1 a=backoff-mode: (+500)

In this example the sender tells the receivers to start the repair session at a random time between the end of the session and 500 seconds.

Example 2 a=backoff-mode: (+500)
a=backoff-mode-users:5000

In this example the sender tells the receivers to compute the back-off time taking into account that there are 5000 users that have joined the multicast session.

5.4 Repair Type Parameter and Repair Token Parameter

This parameter describes both the repair type (i.e. point-to-multipoint repair, point-to-point repair, both) as well as the repair token. The first is used to describe what type of repair is possible. The second describes how a specific object (e.g., a file) is going to be repaired (i.e., the repair type), and what parts of the object are going to be repaired (for example, if point-to-multipoint repair is used). There may be multiple repair-token attribute listings. This attribute may be at session level or media level.

An example syntax for the repair type attribute according to the present invention is given as:

```
a=repair-type-param: repair-type
    wherein
        repair-type = "ptp" / "ptm" / "both"
``` and of the repair token attribute according to the present invention is given as:

```
a=repair-token:"{" repair-type *("," entity)}"
    wherein
        repair-type = "ptp" / "ptm" / "both"
        entity = ("(" File-ID [ *("," SBN *("," ESI) ")" ) /
            (*(", (first_byte_position="
            first_byte_position ",number_of_bytes="
            number_of_bytes ) ")" ) ] ")")
        FILE-ID = <""> textstring <"">
        SBN = (%d) / ("(" %d *("," %d) ")") /("("%d "–" %d ")")
        ESI = (%d) / ("(" %d *("," %d) ")") /("("%d "–" %d
            ")")
        first_byte_position = %d
        number_of_bytes = %d
        textstring = 1*((0x01. .0x09) / 0x0b / 0x0c /
        (0x0e. .0x21)
            /(0x023. .0xff))
            ;any byte except NUL, CR, LF, ' " '
```

Therein, SBN is the Source Block Number, and ESI is the Encoding Symbol ID. The ESI and SBN may be in pairs and the ESI and SBN may be a range or a list of ranges. However, the ESI may not be present alone in this descriptor.

The repair token may be sent per each object (e.g., file). Note that, generally the File-ID text string is expected to be a URI or part thereof.

An example for the use of the repair type attribute is:

a=repair-type-param: ptm

In this example, it is told to the receivers that the repair will be performed via point-to-multipoint.

Examples for the use of the repair token attribute are:

Example 1 a=repair-token: {ptm, ("http://www.file.com/file3.3gp", (10, 20), (12, 134))}

In this example, the repair is done via point-to-multipoint for the file indicated. The blocks that are going to be repaired are those with SBN 10 and ESI 20, and SBN 12 and ESI 134.

Example 2 a=repair-token: {ptm, ("http://www.file.com/file3.3gp", (10-14), (16,34))}

In this example, the repair is done via point-to-multipoint for the file indicated. The blocks that are going to be repaired are those for SBNs 10 to 14 and ESI 34 of SBN 16.

Example 3 a=repair-token: {ptm, ("http://www.file.com/file3.3gpp", "first_byte_position=10,number_of_bytes=150")}

In this example, the repair is done via point-to-multipoint for the file indicated. The number of bytes to be repaired are 150, starting from byte 10.

6. Multiple Channels

The definition of SDP attributes related to multiple channels includes three aspects as will be described below.

6.1 First Aspect

The multiple channel attribute describes the number of channels used by the sender to transmit. It may also be used to check the number of channels against the SDP m-lines.

An example syntax according to the present invention is given below as:
a=flute-ch: value CRLF
wherein
value=% d Therein, value is the number of channels used by the sender to transmit data in a FLUTE session. This parameter may indicate to the receivers that the sender is using multiple channels in the FLUTE session to transmit data. This may also indicate the number of channels used by the sender. The value specified by this descriptor may be used by a receiver to check that it has received all the m-lines describing the destinations. For example, if the value of this parameter is 2, then there should be 2 channels specified by the m-lines.

6.2 Second Aspect

Further, the TSI attribute according to the present invention describes the value of the Transmission Session Identifier (TSI) for the session. An exemplary syntax for this TSI attribute is given as:
a=flute-tsi: value CRLF
wherein
value=% d

6.3 Third Aspect

In this invention, also a novel media descriptor (m-line) and connection data (c-line) used to indicate the presence of a FLUTE session on a certain channel is introduced. This is done by using the m-line in an SDP description as shown in the following example:
m=data 12345 FLUTE/UDP 0
c=IN IP6 FF1E:03AD::7F2E:172A:1E24/1

In the above SDP media descriptor (m-line) and connection data (c-line), the m-line indicates the media used and the c-line indicates the corresponding channel. Thus, in the above example, the m-line indicates that the media is transported on a channel that uses FLUTE over UDP. Further, the c-line indicates the channel address, which, in this case, is an IPv6 address.

An example for the use of the attributes related to multiple channels according to the above-mentioned three aspects is v=0
o=user123 2890844526 2890842807 IN IP6

-continued

```
        2201:056D::112E:144A:1E24
    s=File delivery session example
    i=More information
    t=2873397496 2873404696
    a=source-filter: incl IN IP6 *
        2001:210:1:2:240:96FF:FE25:8EC9
    a=flute-tsi: 3
    a=flute-ch: 2
    m=data 12345 FLUTE/UDP 0
    c=IN IP6 FF1E:03AD::7F2E:172A:1E24/1
    m=data 12346 FLUTE/UDP 0
    c=IN IP6 FF1E:03AD::7F2E:172A:1E30/1
```

The sender indicates in the above example that it will transmit data in the FLUTE session on two channels (a=flute-ch:2). The sender then specifies the channels. These channels are indicated in the line c=IN IP6 FF1E:03AD::7F2E:172A:1E30/1. This also shows to the receivers that the channels are two (maybe more in other cases) consecutive channels. The attribute TSI defined in the line a=flute-tsi:3 describes the TSI (Transmission Session Identifier) for the session. The attribute defined in the line a=source-filter: incl IN IP6*2001:210:1:2:240:96FF:FE25:8EC9 describes a source filter. In this example the sender indicates that the receivers should include the given IP address (2001:210:1:2:240:96FF:FE25:8EC9) into the session. This pair of the (source IP address, TSI) together uniquely identifies a session. It should be noted that although other possibilities may be used, in this case only the incl and * attributes may be used in the above descriptor. The line m=data 12345 FLUTE/UDP 0 is a novel addition to indicate the media used for the channel. In this example, there are two 'm' lines for the two channels described.

To signal to the receivers the parameters to be used in the situation when a repair session outside of the described FLUTE session may be required, the sender uses the SDP attributes defined in section 7 for session repair. These parameters allow the receivers to locate the correct repair server, allows the sender to set a pre-defined repair threshold and allows the sender to define the repair type and other parameters.

7. Content Description Pointer

The content descriptor pointer attribute describes how the sender indicates to the receivers the URI where the content description is stored.

An example syntax for the content descriptor pointer attribute according to the present invention is below as:
a=content-desc: "uri="<">URI <">CRLF
wherein
URI=as defined in RFC 2396

Therein, URI is a valid URI for the Content Description. The URI may be an Extended Markup Language (XML) schema such as a File Description Table (FDT) XML schema, an entry point to an Internet Media Guide (IMG) data model or other such entry point to a schema or data model. A person skilled in the art will be able to find other alternatives using this method.

Figure 1:
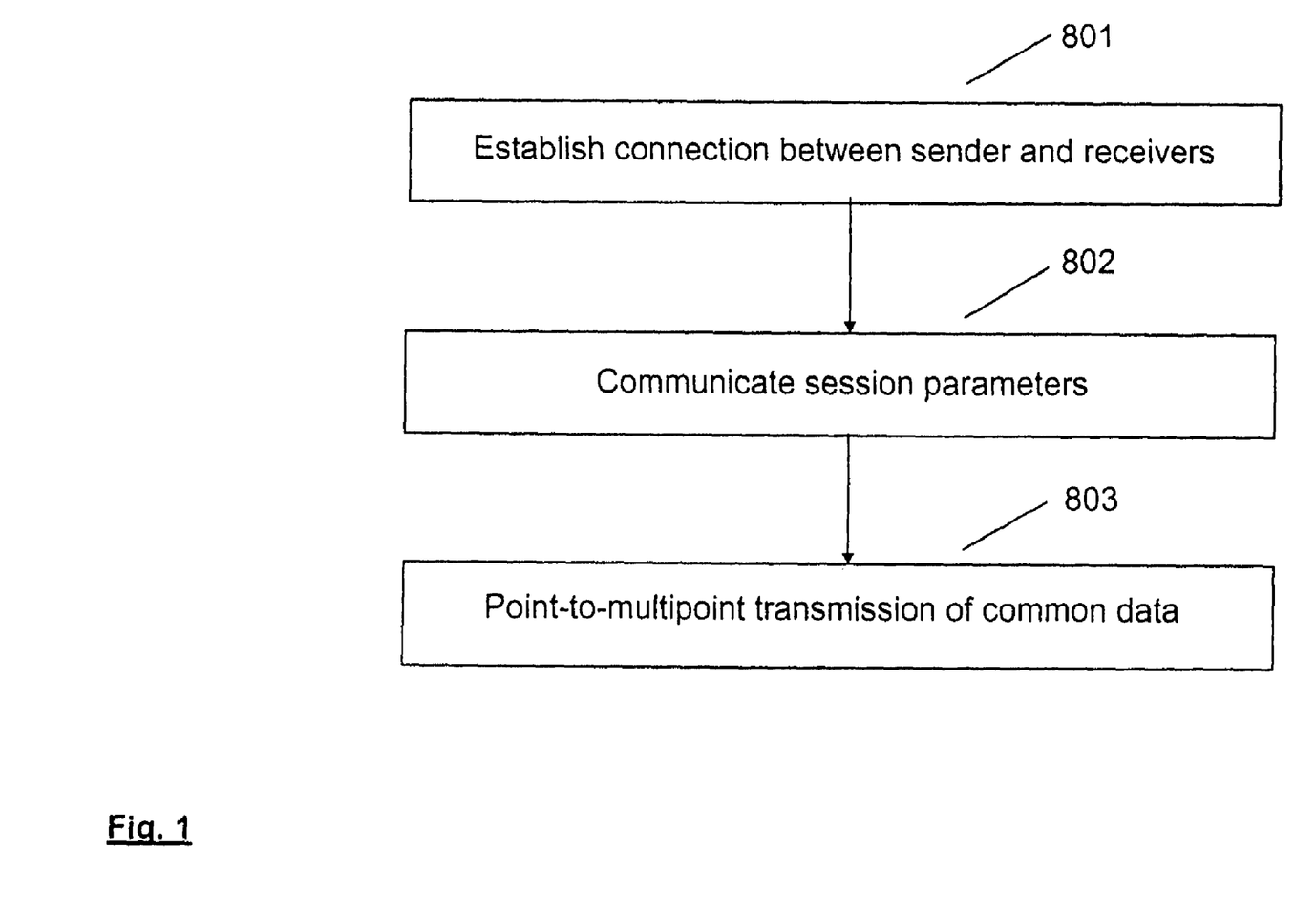
FIG. 1: a flowchart of a possible embodiment of the method according to the present invention.

FIG. 1 depicts a flowchart of a possible embodiment of a method according to the present invention. In a first step 801, a physical or logical connection is established between the sender and the receivers. In a second step 802, then session parameters, as for instance information on an FEC encoding scheme that will be applied in a transmission session or information related to the buffering requirements at the receiver site, are communicated from the sender to the receivers via the communication protocol, for instance SDP. In this case, said session parameters may then be communicated via SDP attributes as exemplarily defined in the above description of the present invention. After these session parameters have been received and processed at said receivers, in a step 803, the point-to-multipoint transmission of common data from the sender to the receivers is performed, which is at least partially defined by said session parameters.

Figure 2:
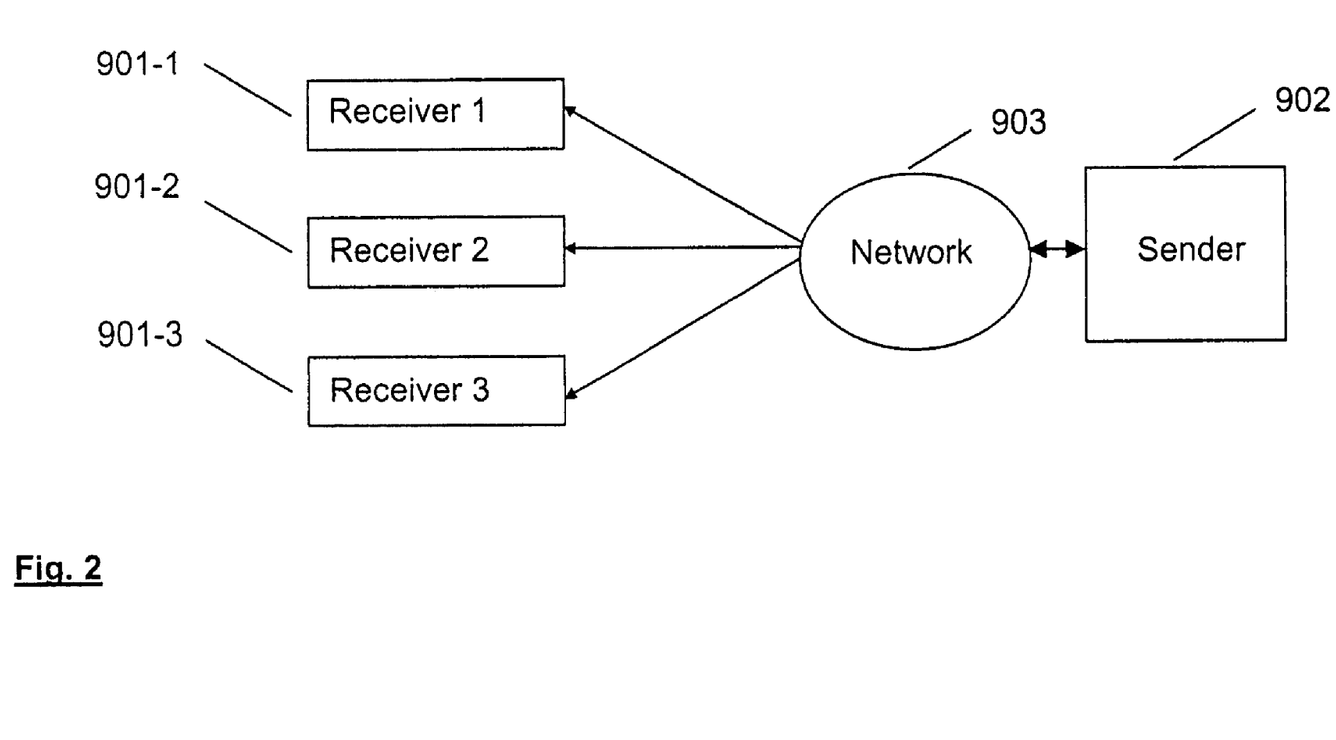
FIG. 2: a schematic view of a possible embodiment of the system according to the present invention.

FIG. 2 schematically depicts a possible embodiment of a system according to the present invention. The system comprises a sender 902, a network 903 and receivers 901-1, 901-2 and 901-3. Said sender 903 may for instance be an MBMS server. From a communication unit of said sender 903, data is transmitted to reception units of said receivers 901-1, 901-2 and 902-3 via said network 903, which may for instance be an IP based broadcast/multicast network, within a point-to-multipoint session. Prior to said point-to-multipoint session, session parameters are communicated from said sender 903 to said receivers 901-1, 901-2 and 901-3 via said communicated protocol, which may for instance be the SCP.

From the examples presented above, it should be readily seen that the present invention provides significant advantages at least with respect to the following aspects:

The invention provides methods for sending to the receivers, outside of a FLUTE session, parameters required for the reception of the session at the receivers.

The invention also provides a method of sending parameters to receivers that are required for establishing point-to-point repair sessions in a situation where the receiver does not receive all the required data during the session. Once again, these parameters are by nature required to be sent outside the session. The use of SDP for sending these parameters to the receivers provides an ideal method to achieve the same.

Furthermore, the invention enables simple and powerfully scalable multiple-back-off-algorithms to be employed according to differential reception recovery demands, in particular by linking different error thresholds to respective back-off modes.

The invention has been described above by means of examples and preferred embodiments. It should be noted that there are alternative ways and variations which will be evident to a skilled person in the art and can be implemented without deviating from the scope and spirit of the appended claims. In particular, the present invention is applicable to all types of broadcast/multicast systems over IP networks, and it is not restricted to mobile networks or 3GPP MBMS systems. Furthermore, the present invention is by no means restricted to FLUTE sessions, but may equally well be applied to other types of sessions.

The invention claimed is:

1. A method comprising:
receiving, at a receiver, a backoff mode attribute and a repair threshold attribute, wherein said backoff mode attribute specifies a backoff mode that provides information on when a receiver that did not correctly receive data sent to a plurality of receivers in a transmission session can start a request for a repair session, wherein said repair threshold attribute specifies an error threshold related to a reception quality of said data received in said transmission session, wherein a plurality of backoff modes and a plurality of error thresholds is used for said transmission session, and wherein at least one of said error thresholds is linked to at least one of said backoff modes, respectively,
determining whether said receiver correctly received said data sent in said transmission session; and
in response to determining that case said receiver did not correctly receive said data sent in said transmission session:
determining an error threshold for said receiver, determining the backoff mode linked to the determined error threshold, requesting a repair session according to the determined backoff mode, wherein in said repair session, at least a part of said data sent to said plurality of receivers in said transmission session being sent at least to said receiver, and receiving data in said repair session.

2. The method according to claim 1, wherein said data is transmitted in said transmission session to said plurality of receivers at least partially over a wireless network.

3. The method according to claim 2, wherein said wireless network is a mobile network that at least partially implements the Multimedia Broadcast/Multicast Service as defined by the Third Generation Partnership Project.

4. The method according to claim 1, wherein said transmission of said data in said transmission session to said plurality of receivers is at least partially controlled by the File Delivery Over Unidirectional Transport protocol.

5. A non-transitory computer readable storage medium comprising a computer program with instructions operable to cause a processor to perform the method of claim 1.

6. An apparatus, comprising:

a processor configured to cause data to be communicated to a plurality of receivers in a transmission session and further configured to cause to be communicated, to said plurality of receivers, a backoff mode attribute and a repair threshold attribute, wherein said backoff mode attribute specifies a backoff mode that provides information on when a receiver that did not correctly receive said data sent in said transmission session can start a request for a repair session, wherein said repair threshold attribute specifies an error threshold related to a reception quality of said data received in said transmission session, wherein a plurality of backoff modes and a plurality of error thresholds is used for said transmission session, wherein at least one of said error thresholds is linked to at least one of said backoff modes, respectively, thus allowing said receiver to request said repair session according to the backoff mode linked to an error threshold determined by said receiver, and wherein in said repair session, at least a part of said data sent in said transmission session being sent at least to said receiver.

7. An apparatus, comprising:

a reception unit configured to receive, at a receiver, a backoff mode attribute and a repair threshold attribute, wherein said backoff mode attribute specifies a backoff mode that provides information on when a receiver that did not correctly receive data sent to a plurality of receivers in a transmission session can start a request for a repair session, wherein said repair threshold attribute specifies an error threshold related to a reception quality of said data received in said transmission session, wherein a plurality of backoff modes and a plurality of error thresholds is used for said transmission session, and wherein at least one of said error thresholds is linked to at least one of said backoff modes, respectively, said apparatus further comprising:

a processor configured to determine whether said reception unit correctly received said data sent in said transmission session, in response to determining that said reception unit did not correctly receive said data sent in said transmission session, determine an error threshold for said receiver, determine the backoff mode linked to the determined error threshold, and request a repair session according to the determined backoff mode, wherein in said repair session, at least a part of said data sent in said transmission session being sent at least to said receiver, and wherein said reception unit is further configured to receive data in said repair session.

8. The apparatus according to claim 6, wherein said data is transmitted in said transmission session to said plurality of receivers at least partially over a wireless network, and wherein said wireless network is a mobile network that at least partially implements the Multimedia Broadcast/Multicast Service as defined by the Third Generation Partnership Project.

9. The apparatus according to claim 6, wherein said transmission of said data in said transmission session to said plurality of receivers is at least partially controlled by the File Delivery Over Unidirectional Transport protocol.

10. The apparatus according to claim 7, wherein said data is transmitted in said transmission session to said plurality of receivers at least partially over a wireless network, and wherein said wireless network is a mobile network that at least partially implements the Multimedia Broadcast/Multicast Service as defined by the Third Generation Partnership Project.

11. The apparatus according to claim 7, wherein said transmission of said data in said transmission session to said plurality of receivers is at least partially controlled by the File Delivery Over Unidirectional Transport protocol.

12. The apparatus according to claim 7, wherein said backoff mode attribute and said repair threshold parameter are communicated before or during an establishment of said transmission session.

13. The apparatus according to claim 7, wherein said data is transmitted in said transmission session to said plurality of receivers at least partially over a wireless network.

14. A method comprising:

causing data to be communicated to a plurality of receivers in a transmission session and causing to be communicated, to said plurality of receivers, a backoff mode attribute and a repair threshold attribute, wherein said backoff mode attribute specifies a backoff mode that provides information on when a receiver that did not correctly receive said data sent in said transmission session can start a request for a repair session, wherein said repair threshold attribute specifies an error threshold related to a reception quality of said data received in said transmission session, wherein a plurality of backoff modes and a plurality of error thresholds is used for said transmission session, wherein at least one of said error thresholds is linked to at least one of said backoff modes, respectively, thus allowing said receiver to request said repair session according to the backoff mode linked to an error threshold determined by said receiver, and wherein in said repair session, at least a part of said data sent in said transmission session being sent at least to said receiver.

15. A non-transitory computer readable storage medium comprising a computer program with instructions operable to cause a processor to perform the method of claim 14.

16. The apparatus according to claim 6, wherein said communication unit is configured to communicate said backoff mode attribute and said repair threshold attribute as attributes of the Session Description Protocol.

17. The apparatus according to claim 7, wherein said reception unit is configured to receive said backoff mode attribute and said repair threshold attribute as attributes of the Session Description Protocol.

18. The method according to claim 14, wherein said backoff mode attribute and said repair threshold attribute are communicated as attributes of the Session Description Protocol.

19. The apparatus according to claim 6, wherein said backoff mode attribute and said repair threshold attribute are communicated to said receiver before or during the establishment of said transmission session.

20. The method according to claim 14, wherein said backoff mode attribute and said repair threshold attribute are communicated to said receiver before or during the establishment of said transmission session.

21. The method according to claim 1, wherein said receivers are user equipment.

22. The apparatus according to claim 7, wherein said receivers are user equipment.

23. The method according to claim 14, wherein said receivers are user equipment.

24. The method according to claim 14, wherein said data is transmitted in said transmission session at least partially over a wireless network, and wherein said wireless network is a mobile network that at least partially implements the Multimedia Broadcast/Multicast Service as defined by the Third Generation Partnership Project.

25. The method according to claim 14, wherein said transmission of said data in said transmission session is at least partially controlled by the File Delivery Over Unidirectional Transport protocol.

26. The method according to claim 1, wherein said backoff mode attribute and said repair threshold attribute are communicated to said plurality of receivers before or during the establishment of said transmission session.

27. The method according to claim 1, wherein said backoff mode attribute and said repair threshold attribute are received as attributes of the Session Description Protocol.

28. The method according to claim 1, wherein an entering into said repair session by said receiver depends on a relationship between a reception quality of said data received by said receiver within said transmission session and said error threshold.

29. The method according to claim 1, wherein said error threshold is quantified in terms of an error unit, an error value, a measurement window unit and a measurement window value.

30. The method according to claim 1, wherein said error thresholds are explicitly or implicitly labelled.

31. The method according to claim 1, wherein at least two of said error thresholds are linked to at least two of said backoff modes, respectively.

32. The method according to claim 1, wherein said backoff modes are assigned to a receiver in dependence on a relationship between a reception quality of said data received by said receiver during said transmission session and a reception quality as demanded by said error thresholds.

33. The method according to claim 1, wherein said information is represented by a backoff unit, a backoff value and a backoff window.

34. The method according to claim 1, wherein said information is represented by a variable that indicates if absolute or relative timing is used, and a time value.

35. The method according to claim 1, wherein said information comprises an error threshold and three values X, Y and Z, and wherein at said receiver, if a reception quality of said data as received by said receiver within said transmission session is better than a reception quality dictated by said error threshold, said request for said repair session is started randomly within a time interval of duration X, wherein said interval starts at the end of said transmission session; and otherwise said request for said repair session is started randomly within a time period between Y and Y+Z, wherein Y is counted from the end of said transmission session.

36. The method according to claim 1, further comprising receiving a repair type parameter attribute that specifies if said repair session can be a point-to-point session, a point-to-multipoint session, or both.

37. The method according to claim 1, further comprising receiving a repair token attribute that specifies at least one of the type of said repair session, and information on which parts of said data that is not correctly received at least one of said plurality of receivers within said transmission session will be transmitted from said repair server to said at least one receiver within said repair session.

38. The apparatus according to claim 7, wherein an entering into said repair session by said receiver depends on a relationship between a reception quality of said data received by said receiver within said transmission session and said error threshold.

39. The apparatus according to claim 7, wherein said error threshold is quantified in terms of an error unit, an error value, a measurement window unit and a measurement window value.

40. The apparatus according to claim 7, wherein said error thresholds are explicitly or implicitly labelled.

41. The apparatus according to claim 7, wherein at least two of said error thresholds are linked to at least two of said backoff modes, respectively.

42. The apparatus according to claim 7, wherein said backoff modes are assigned to a receiver in dependence on a relationship between a reception quality of said data received by said receiver during said transmission session and a reception quality as demanded by said error thresholds.

43. The apparatus according to claim 7, wherein said information is represented by a backoff unit, a backoff value and a backoff window.

44. The apparatus according to claim 7, wherein said information is represented by a variable that indicates if absolute or relative timing is used, and a time value.

45. The apparatus according to claim 7, wherein said information comprises an error threshold and three values X, Y and Z, and wherein at said receiver, if a reception quality of said data as received by said receiver within said transmission session is better than a reception quality dictated by said error threshold, said request for said repair session is started randomly within a time interval of duration X, wherein said interval starts at the end of said transmission session; and otherwise said request for said repair session is started randomly within a time period between Y and Y+Z, wherein Y is counted from the end of said transmission session.

46. The apparatus according to claim 7, wherein said reception unit is further configured to receive a repair type parameter attribute that specifies if said repair session can be a point-to-point session, a point-to-multipoint session, or both.

47. The apparatus according to claim 7, wherein said reception unit is further configured to receive a repair token attribute that specifies at least one of the type of said repair session, and information on which parts of said data that is not correctly received at least one of said plurality of receivers within said transmission session will be transmitted from said repair server to said at least one receiver within said repair session.

* * * * *

UNITED STATES PATENT AND TRADEMARK OFFICE
CERTIFICATE OF CORRECTION

| | | |
|---|---|---|
| PATENT NO. | : 8,296,436 B2 | Page 1 of 1 |
| APPLICATION NO. | : 10/806023 | |
| DATED | : October 23, 2012 | |
| INVENTOR(S) | : Curcio et al. | |

It is certified that error appears in the above-identified patent and that said Letters Patent is hereby corrected as shown below:

In the Claims:

Column 22,
Line 64, "that case said" should read --that said--.

Column 26,
Lines 13 and 61, "received at least one of" should read --received at at least one of--.

Signed and Sealed this
Thirteenth Day of August, 2013

Teresa Stanek Rea
*Acting Director of the United States Patent and Trademark Office*